United States Patent
Raggio

(10) Patent No.: US 9,187,947 B2
(45) Date of Patent: Nov. 17, 2015

(54) METHOD OF FORMING A VACUUM INSULATED GLASS PANEL SPACER

(75) Inventor: William Raggio, Del Mar, CA (US)

(73) Assignee: Rayotek Scientific, Inc., San Diego, CA (US)

( * ) Notice: Subject to any disclaimer, the term of this patent is extended or adjusted under 35 U.S.C. 154(b) by 865 days.

(21) Appl. No.: 13/310,884

(22) Filed: Dec. 5, 2011

(65) Prior Publication Data

US 2013/0139948 A1 Jun. 6, 2013

(51) Int. Cl.
| | |
|---|---|
| *B24B 1/00* | (2006.01) |
| *B24B 31/02* | (2006.01) |
| *E06B 3/663* | (2006.01) |
| *B24B 31/00* | (2006.01) |
| *B24B 49/12* | (2006.01) |
| *B24B 9/08* | (2006.01) |
| *C03B 33/033* | (2006.01) |
| *C03B 33/07* | (2006.01) |
| *B28D 1/22* | (2006.01) |

(52) U.S. Cl.
CPC .............. *E06B 3/66304* (2013.01); *B24B 9/08* (2013.01); *B24B 31/00* (2013.01); *B24B 49/12* (2013.01); *B28D 1/225* (2013.01); *C03B 33/033* (2013.01); *C03B 33/076* (2013.01); *Y10T 83/04* (2015.04); *Y10T 225/12* (2015.04)

(58) Field of Classification Search
CPC .......... B24B 1/00; B24B 31/02; B24B 31/06; B24B 31/10
USPC ................. 451/32, 33, 34, 35, 113, 104, 326; 125/23.01, 23.02
See application file for complete search history.

(56) References Cited

U.S. PATENT DOCUMENTS

| 49,167 A | 8/1865 | Stetson |
|---|---|---|
| 3,030,746 A * | 4/1962 | Firestine et al. ............... 451/42 |
| 4,138,304 A * | 2/1979 | Gantley ....................... 156/268 |
| 4,580,371 A * | 4/1986 | Akhavi ......................... 451/32 |
| 4,653,680 A | 3/1987 | Regan |
| 4,683,154 A | 7/1987 | Benson et al. |
| 5,124,185 A | 6/1992 | Kerr et al. |
| 5,134,039 A | 7/1992 | Alexander et al. |

(Continued)

FOREIGN PATENT DOCUMENTS

WO 96/12862 5/1996

OTHER PUBLICATIONS

Shamrock Technologies NanoFLON(R) P 39B Thermoplastic Grade PTFE Additive, MatWeb Material Property Data, obtained from www.matweb.com on Nov. 18, 2011, 2 pages.

(Continued)

*Primary Examiner* — Robert Rose
(74) *Attorney, Agent, or Firm* — Thompson Coburn LLP

(57) ABSTRACT

A vacuum insulated glass (VIG) panel includes a first glass panel and a second glass panel spaced from the first glass panels. A spacer is disposed between the first and second glass panels. The spacer includes first and second generally opposed faces, and a plurality of sides extending therebetween. The spacer is processed using tumbling and polishing operations to preferably round all corners of the spacer and form a circular contact footprint on opposed side faces of the spacer. The spacer surface break conditions are measured during tumbling and/or polishing operations using optical flat measuring equipment. Following the polishing operation the spacer is thermally processed to strengthen the spacer.

13 Claims, 4 Drawing Sheets

(56) References Cited

U.S. PATENT DOCUMENTS

| | | | |
|---|---|---|---|
| 5,494,549 A * | 2/1996 | Oki et al. | 156/268 |
| 5,517,260 A | 5/1996 | Glady et al. | |
| 5,721,050 A | 2/1998 | Roman et al. | |
| 5,769,297 A | 6/1998 | Loomis et al. | |
| 6,083,578 A | 7/2000 | Collins et al. | |
| 6,420,002 B1 | 7/2002 | Aggas et al. | |
| 6,677,024 B2 | 1/2004 | Jousse et al. | |
| 6,946,171 B1 | 9/2005 | Aggas | |
| 7,070,703 B2 * | 7/2006 | Benning et al. | 216/89 |
| 7,976,360 B2 * | 7/2011 | Jaunzemis et al. | 451/35 |
| 2001/0049031 A1 | 12/2001 | Bajorek et al. | |
| 2007/0082179 A1 | 4/2007 | Wade et al. | |
| 2008/0032904 A1 | 2/2008 | Watanabe et al. | |
| 2009/0280415 A1 | 11/2009 | Koike et al. | |
| 2009/0324858 A1 | 12/2009 | Jaeger | |
| 2010/0323277 A1 | 12/2010 | Roberts | |
| 2011/0147219 A1 | 6/2011 | Lambourne et al. | |

OTHER PUBLICATIONS

Kocer, "Mechanical Deformations in a Vacuum Glazing; a Finite Element Modeling Study", Proceedings Abstract [online], Jun. 20, 2011, Retrieved on Apr. 3, 2012, Retrieved from the Internet: <URL:http://www.gpd.fi/Global/GPD/Finland/Finland%202011/Accepted%20Abstarcts/IGU/Cenk%20Kocer.pdf.

Weinlader et al., "VIG—Vacuum Insulation Glass" [online], Dec. 2005, Retrieved Apr. 3, 2012, Retrieved from the Internet: <URL:http://www.bine.info/fileadmin/content/Publikationen/Projekt-Infos/Zusatzinfos/2008-01_Fachartikel.pdf.

* cited by examiner

METHOD OF FORMING A VACUUM INSULATED GLASS PANEL SPACER

BACKGROUND OF THE DISCLOSURE

This disclosure generally pertains to glazing panels, and more particularly relates to vacuum insulated glazing panels and methods of forming the same. The construction industry is constantly striving to increase the energy efficiency of buildings. Improvements such as higher efficiency insulation materials, more efficient building techniques and standards, and improved efficiency heating, ventilation, and air conditioning systems have all increased the energy efficiency that can be achieved in both domestic and commercial buildings. However, windows continue to present a significant obstacle for increased building energy efficiency. Due to the primary function of windows, namely a high degree of transparency, the choice of materials and overall structure of windows is largely constrained. This disclosure provides for an improved window construction method.

SUMMARY OF THE DISCLOSURE

According to one embodiment, a vacuum insulated glass (VIG) panel includes a first glass panel, and a second glass panel spaced from the first glass panel. A spacer may be disposed between the first and the second glass panels. The spacer may have a first and a second generally opposed face. The spacer may also include a plurality of sides extending between the first and second faces. The plurality of sides may define a generally polygonal periphery of the first and second faces. Corners of the polygonal periphery may be generally rounded, and corners between the plurality of sides and the first and second faces may also be generally rounded.

One or more of the following features may be included. The VIG panel may include a plurality of spacers. The plurality of spacers may be generally arranged in a matrix between the first and the second glass panels. The spacer may have a generally rectilinear periphery. The spacer may have a generally triangular periphery.

A refractive index of the spacer may be generally the same as a refractive index of at least one of the first glass panel and the second glass panel.

According to another embodiment, a method of manufacturing a spacer for a VIG panel may include cutting a plurality of spacer blanks having a generally polygonal profile from a sheet of glass. The method may also include polishing a spacer blank to at least partially round one or more corners of the spacer blank to form a spacer.

One or more of the following features may be included. Cutting the plurality of spacer blanks may include scribing a sheet of glass to create a plurality of scribe lines in the sheet of glass. The method may further include breaking the sheet of glass along the plurality of scribe lines. The plurality of scribe lines may define the generally polygonal profile. Breaking the sheet of glass along the plurality of scribe lines may include supporting the glass sheet on an elastomeric sheet, and rolling a roller across the glass sheet in a direction perpendicular to the plurality of scribe lines. Breaking the sheet of glass may further include adhering a dicing tape to a side of the glass sheet opposite the plurality of scribe lines. At least a portion of the plurality of spacer blanks may be released from the dicing tape after breaking the sheet of glass. In further embodiments, cutting the plurality of spacer blanks may include cutting the plurality of spacer blanks using one or more of a saw, a laser, and a water jet.

Polishing the spacer blank may include tumbling the spacer blank with a polishing compound. Polishing the spacer blank may include chemically etching the spacer blank. The method may also include thermally polishing the spacer at an elevated temperature. The method may also include chemically strengthening the spacer in an ion bath. The spacer may further be cleaned using one or more of a solvent and a surfactant.

According to yet another embodiment, a method of manufacturing a VIG panel may include cutting a plurality of spacer blanks from a sheet of glass. The plurality of spacer blanks may have a generally polygonal periphery. The plurality of spacer blanks may be polished to at least partially round one or more corners of the spacer blanks, thereby forming a plurality of spacers. At least a portion of the plurality of spacers may be disposed between a first glass panel and a second glass panel. A volume defined between the first glass panel and the second glass panel may be at least partially evacuated. According to various embodiments, the plurality of spacers may have a generally rectilinear periphery or a generally triangular periphery.

The details of one or more implementations are set forth in the accompanying drawings and the description below. Other features will become apparent from the description, the drawings, and the claims.

DETAILED DESCRIPTION

Figure 1:
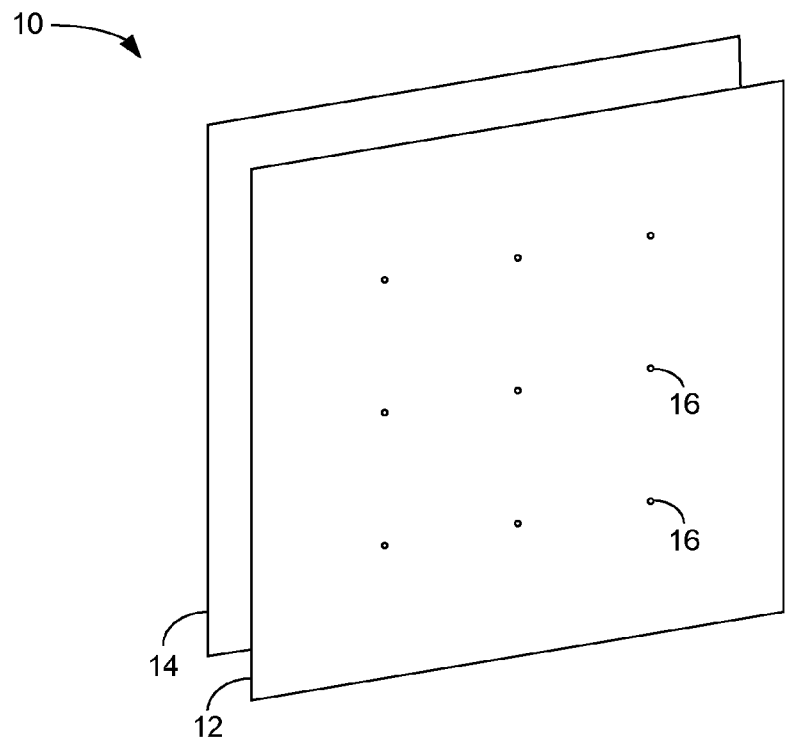
FIG. 1 diagrammatically depicts an embodiment of a VIG panel.

Referring to FIG. 1, a VIG panel 10 may generally include a first glass panel 12 and a second glass panel 14. The first glass panel 12 and the second glass panel 14 may be spaced from one another. One or more spacers (e.g., a spacer 16) may be disposed between the first glass panel 12 and the second glass panel 14 to define a separation space 18 between the first glass panel 12 and the second glass panel 14. Further, the separation space 18 may be at least partially evacuated.

The first glass panel 12 and the second glass panel 14 may be formed from any suitable glazing material, such as soda lime glass that may be formed using a known float process, or other suitable process. However, it should be appreciated that the material and manufacturing process used to form the first glass panel 12 and the second glass panel 14 may vary depending upon design criteria and the intended application for the VIG panel 10. For example, while common float glass may be utilized for a domestic or residential application, a higher strength material/process may be utilized when the VIG panel 10 is intended for use in a glazing unit in a high rise building, or the like. As such, the present disclosure is not intended to be limited to a specific material or manufacturing process.

As indicated above, the separation space 18 between the first glass panel 12 and the second glass panel 14 may be at least partially evacuated. The at least partial evacuation of the separation space 18 may be maintained via a seal provided between the first glass panel 12 and the second glass panel 14. Examples of suitable seals may include, but are not limited to, a glass frit seal, an elastomeric (such as a rubber or silicone) seal, a metallic seal, or the like. The at least partial evacuation of the separation space 18 may reduce conductive and convective heat transfer between the first glass panel 12 and the second glass panel 14. Additionally, at least one surface of the first glass panel 12 and the second glass panel 14 may include a coating, such as a commercially known low emissivity coating, to minimize radiative heat transfer between the first glass panel 12 and the second glass panel 14. According to some embodiments, the foregoing configuration may be capable of providing the VIG panel 10 having an insulating value in the range of between about R-8 to about R-12.

The spacer 16 may aid in maintaining the separation space 18. For example, the at least partial evacuation of the separation space 18 may result in a relatively low pressure (e.g., a pressure below atmospheric pressure) in between the first glass panel 12 and the second glass panel 14, and a relatively high pressure (e.g., atmospheric pressure) on the outside (e.g., a side opposite the separation space 18) of the first glass panel 12 and the second glass panel 14. The pressure differential between the outside of the first glass panel 12 and the second glass panel 14 and the separation space may result in an inward (i.e., toward the separation space 18) force on the first glass panel 12 and the second glass panel 14. The inward force on the first glass panel 12 and the second glass panel 14 may result in deflection of the first glass panel 12 and the second glass panel 14 toward one another. The deflection of the first glass panel 12 and the second glass panel 14 may result in an excessive strain on one or both of the first glass panel 12 and the second glass panel 14, and the failure (e.g., cracking or complete breakage) of one or both of the first glass panel 12 and the second glass panel 14. Further, even in the absence of failure, the deflection of the first glass panel 12 and the second glass panel 14 may result in contact between the first glass panel 12 and the second glass panel 14. Such contact may result in thermal bridging between the first glass panel 12 and the second glass panel 14. Thermal bridging may allow for conductive heat transfer between the first glass panel 12 and the second glass panel 14, thereby decreasing the insulating properties of the VIG panel 10.

Consistent with the foregoing, the spacer 16 disposed between the first glass panel 12 and the second glass panel 14 may control and/or minimize deflection experienced by the first glass panel 12 and the second glass panel 14. For example, the spacer 16 may act as a compressive, load-bearing member that may resist the inward deflection of the first glass panel 12 and/or the second glass panel 14. As such, the spacer 16 may prevent thermal bridging between the first glass panel 12 and the second glass panel, and may also prevent failure of the first glass panel 12 and the second glass panel 14. As the spacer 16 may be in direct contact with each of the first glass panel 12 and the second glass panel 14, the spacer 16 may desirably have a relatively low thermal conductivity, thereby providing a relatively low thermally conductive pathway between the first glass panel 12 and the second glass panel 14. Similarly, in the interest of providing a relatively low thermally conductive pathway between the first glass panel 12 and the second glass panel 14, the spacer 16 may be provided having a relatively small contact area with each of the first glass panel 12 and the second glass panel 14. For example, in an embodiment, the spacer 16 may have a contact surface on the order of approximately 1 mm by 1 mm. Of course, other contact surface dimensions may be equally utilized.

Further, the spacer 16 may be disposed within the viewing area of the VIG panel 10. In one embodiment, the spacer 16 may have a refractive index that may be generally the same, or close to the same as the refractive index of at least one of the first glass panel 12 and the second glass panel 14. Consistent with such an embodiment, a refractive index of the spacer 16 that is generally the same, or close to the same, as the refractive index of at least one of the first glass panel 12 and the second glass panel 14 may reduce and/or eliminate optical distortion caused by the spacer 16. Similarly, the spacer 16 may desirably be clear and/or have a color that may be generally the same as the color of one or more of the first glass panel 12 and the second glass panel 14. As with the refractive index of the spacer 16, a color (or clearness) generally the same as the color of one or more of the first glass panel 12 and the second glass panel 14 may reduce an optical impact on the VIG panel 10 caused by the spacer 16 (e.g., a visual artifact, such as distortion, or visual perceptibility). Further, desirably, the spacer 16 may resist color change (e.g., yellowing, etc.) upon prolonged exposure to light. Accordingly, a reduced optical impact caused by the spacer 16 may persist throughout at least a portion of the useful life of the VIG panel 10.

In a circumstance in which the temperature of an environment adjacent one or both of the first glass panel 12 and the second glass panel 14 may vary over time, at least one of the first glass panel 12 and the second glass panel 14 may expand and contract relative to the other. As such, at least one of the first glass panel 12 and the second glass panel 14 may move relative to the spacer 16. In some embodiments, the spacer 16 may exhibit at least some degree of lubricity relative to one or both of the first glass panel 12 and the second glass panel 14, such that the movement of the first glass panel 12 and/or the second glass panel 14 relative to spacer 16 may occur without experiencing stress sufficient to damage the first glass panel 12, the second glass panel 14, and/or the spacer 16. Additionally, the hardness of the spacer 16 may be selected such that the compressive loading on the spacer 16 (e.g., due to the deflection of one or both of the first glass panel 12 and the second glass panel 14 toward the other) may not damage either of the first glass panel 12 or the second glass panel 14, or damage the spacer 16. For example, an excessive hardness of the spacer 16 relative to one or both of the first glass panel 12 and the second glass panel 14 may result in the spacer 16 digging into (e.g., indenting or scoring) one or both of the first glass panel 12 and the second glass panel 14. A resulting indentation or scoring in one or both of the first glass panel 12 and the second glass panel 14 may result in the creation of a flaw in one or both of the first glass panel 12 and the second glass panel 14, which may result in a failure of the glass panel at a lower stress than a failure stress of a glass panel not having a flaw. Correspondingly, if the hardness of the spacer 16 is excessively low, the compressive stress imparted on the spacer 16 may result in the deformation or failure (e.g., crushing) of the spacer 16. A desired hardness of the spacer 16 may be selected based upon, at least in part, a hardness of one or both of the first glass panel 12 and the second glass panel 14.

Referring still to FIG. 1, the VIG panel 10 may include a plurality of the spacers 16. The number of spacers may be based upon, at least in part, the size of the VIG panel 10. For example, the number and arrangement of the spacers between the first glass panel 12 and the second glass panel 14 may be selected to provide a desired resistance to deflection, as well as a desired compressive loading on each spacer. In one embodiment, the plurality of spacers may be generally arranged in a matrix between the first glass panel 12 and the second glass panel 14. The spacers may, for example, be arranged in an approximately 4 cm by 4 cm grid. However, this embodiment should not be construed as a limitation on the present disclosure as other spacings may be equally utilized depending upon design criteria, as well as spacer and glass panel characteristics. Further, spacer arrangements other than a matrix may also be utilized, for example radial patterns, etc.

Figure 2:
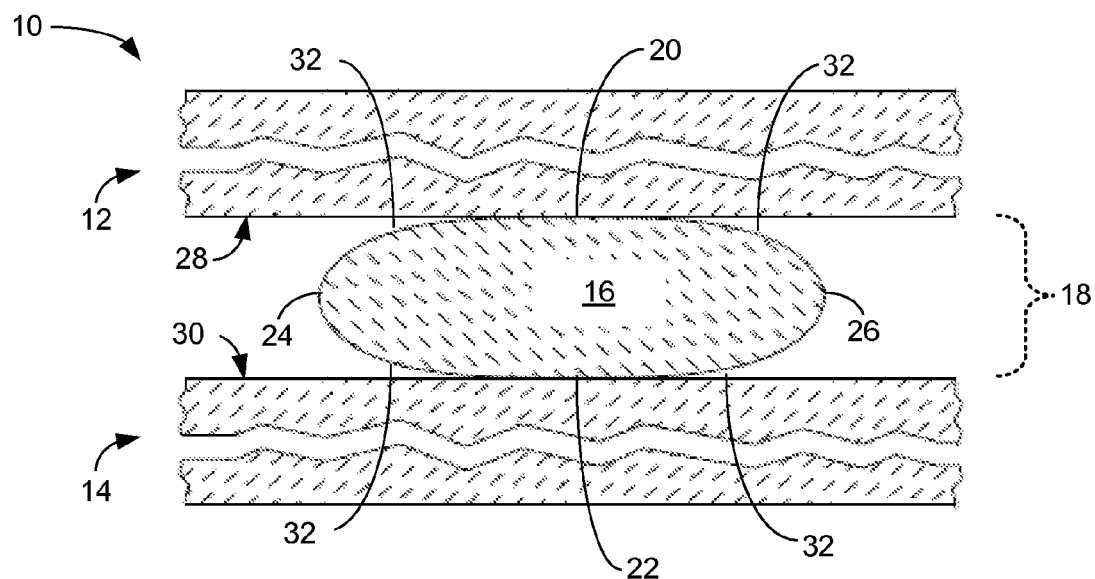
FIG. 2 depicts a cross-sectional view of the VIG panel of FIG. 1.

Referring also to FIG. 2, the spacer 16 may include first and second generally opposed faces 20,22. The spacer 16 may also include a plurality of sides (e.g., sides 24, 26 shown in the cross-section view of FIG. 2) extending between the first and second faces 20,22. For example, as shown in FIG. 2, the first face 20 of the spacer 16 may be generally adjacent to an inner surface 28 of the first glass panel 12, and the second face 22 of the spacer 16 may be generally adjacent to an inner surface 30 of the second glass panel 14. The first and second surfaces 20,24 are generally rounded off and/or formed with surface breaks 32 toward the coterminous edge of the respective face and side. As shown in the cross-sectional profile of FIG. 2, the surface breaks 32 may be generally rounded, and as shown in the illustrated embodiment, the surface breaks may be such that the sides 24, 26 are shown as a generally continuous curve. However, in other embodiments, the sides of the spacer 16 may include an at least partially flat region between the faces 20, 22 of the spacer 16. The rounded corners of the spacer 16 may minimize stress concentration of the glass panels 12, 14 arising from the glass panels 12, 14, deflecting against the spacer 16 at the corners and edges.

Figure 3:
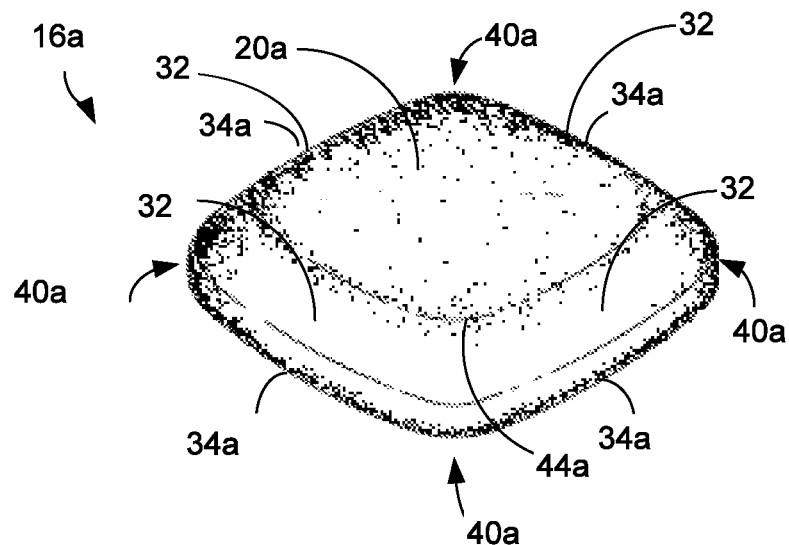
FIG. 3 diagrammatically depicts an embodiment of a spacer that may be used in a VIG panel.
Figure 4:
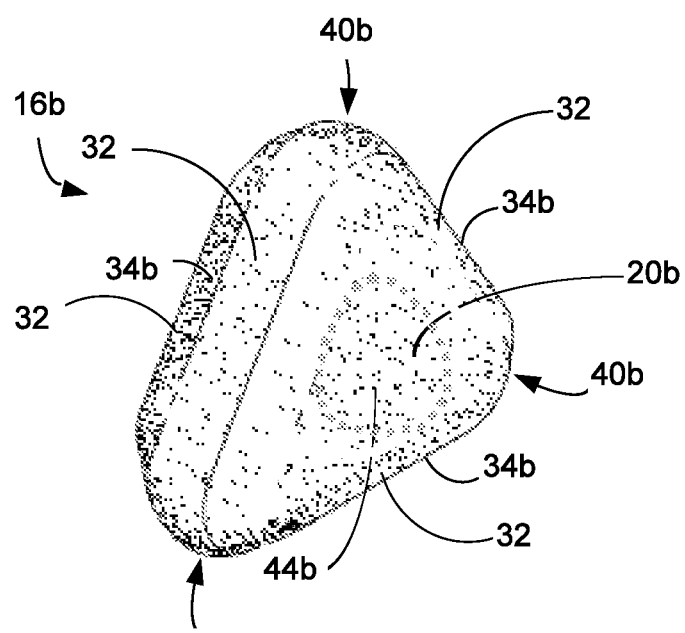
FIG. 4 diagrammatically depicts another embodiment of a spacer that may be used in a VIG panel.

Referring to FIGS. 3 and 4, illustrative examples of the generally polygonal periphery of the first and second faces 20,22 of the spacer (e.g., rectilinear spacer 16a and triangular spacer 16b) are shown. While illustrative examples of spacers suitable for use in the VIG panel 10 are shown having a rectilinear shape and a triangular shape, this should not be construed as a limitation of the present disclosure, as spacers having other polygonal peripheries may be equally utilized.

With particular reference to FIG. 3, the spacer 16a may include a plurality of sides 34a defining a polygonal (i.e., a rectilinear) periphery of the first face 20a and second face (not shown) of the spacer. In addition to the surface breaks 32 discussed above, the corners 40a of the sides 34a may be generally rounded. The generally rounded corners 40a, may reduce stress concentration at the spacer corners of the first and second glass sheets 12,14 when deflecting against the spacer 16a. In addition to the corners 40a being generally rounded, the sides 34a may also have an at least partially arcuate profile along their respective lengths. For example, the sides 34a may be generally arcuate and/or tapered toward each respective corner. Consistent with one embodiment, less than about 50% of each side (20,22) may be optically flat (e.g., straight when analyzed relative to an optical flat). FIG. 4 shows a similar configuration for the spacer 16b that includes a plurality of the sides 34b defining a polygonal (i.e., triangular) periphery of the first face 20b and the second face (not shown) of the spacer 16b. In addition to the surface breaks 32 discussed above, the corners 40b of the sides 33b may be generally rounded, and the sides 34b may also have an at least partially arcuate profile along their respective lengths.

The spacers 16a,16b shown in FIGS. 2-4 may be formed with surface breaks, corner breaks and general arcuate sides so as to form a contact footprint (FIG. 3, 44a; FIG. 4, 44b) upon which the respective glass panels rest. Preferably, the footprint on the spacer is circular. As will be described below, the polishing and tumbling processing of a spacer blank to produce a finish spacer tends to be more aggressive on the corners of the spacer blank. This tends to produce a generally circular contact footprint for the finished spacer. An illustrative example of a spacer may generally have a contact footprint dimension of approximately 1 mm by 1 mm, or a diameter of roughly 1 mm. Additionally, in such an illustrative example, the spacer may have a thickness in the range of about 150 microns to about 500 microns. Of course, other footprint dimensions and thicknesses may be equally utilized depending upon design preference and criteria.

According to one embodiment, the spacers 16 may generally be formed by cutting a plurality of spacer blanks having a generally polygonal periphery, as discussed above, from a sheet of glass. The spacer blanks may then be polished to at least partially round all of the corners of the blank (e.g., one or more of the corners 40a,40b between the sides 34a,34b of the polygonal periphery and/or one or more corners between the sides 34a,34b and the faces 20, 22 (i.e., surface breaks 32)). A finished spacer with softer or more broken corners and a near round or generally circular contact footprint shape allows for a more evenly distributed load and reduced edge stress risers. Polishing and tumbling processes allow for the elimination of stress risers from the corners. In some embodiments, the cutting and polishing of the spacer blanks may be carried out in a manner to minimize chipping in the final spacers. Examples of sheet glass may include, for example Schott D263® thin glass sheet, available from SCHOTT North America, Inc.; Schott AF-45, also available from SCHOTT North America, Inc.; Corning Gorilla® Glass, available from Corning Incorporated; Dragontrail Glass, available from ASG, or other suitable glass sheet stock having a generally high tolerance thickness.

Figure 5:
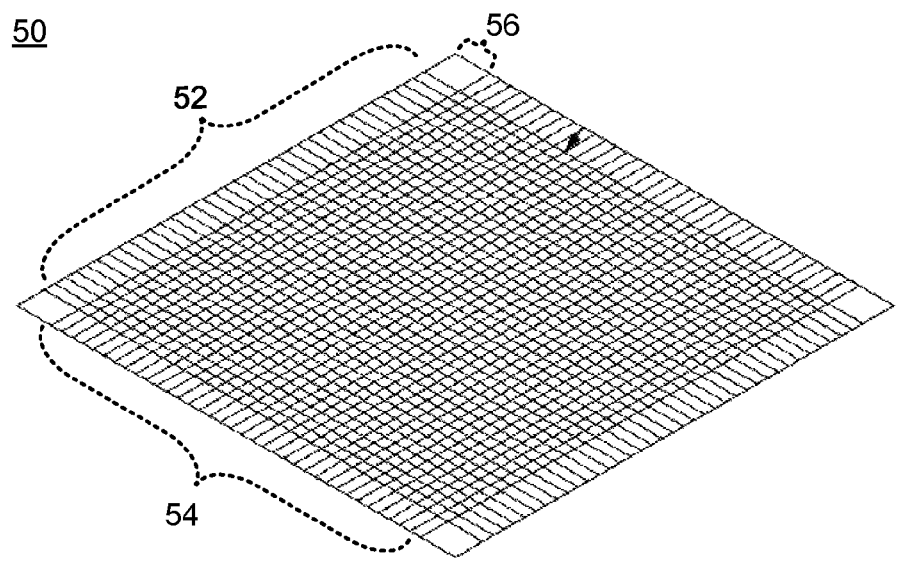
FIG. 5 diagrammatically depicts a glass sheet scribed to produce spacers for use in a VIG panel.

Cutting the plurality of spacer blanks may include scribing a sheet of glass to create a plurality of scribe lines in the sheet of glass. The glass sheet may be scribed using a computer numerical controlled scribing machine, or other suitable scribing techniques. For example, and referring also to FIG. 5, a glass sheet 50 may be scribed with a plurality of scribe lines (e.g., scribe lines 52, 54, generally) that may define the generally polygonal periphery of the spacer blanks. While FIG. 5 generally depicts scribe lines defining a generally rectilinear periphery, the glass sheet may be scribed to create scribe lines defining other polygonal peripheries, such as triangular, hexagonal, etc. As also shown in FIG. 5, the glass sheet 50 may be scribed to provide a margin 56 around the perimeter of the glass sheet 50. The margin 56 may reduce the likelihood of partial or damaged spacer blanks being formed around the perimeter of the glass sheet 50. Again referring to the illustrative example of a generally 1 mm by 1 mm spacer, the margin 56 may be about 4 mm to reduce the likelihood of partial or damaged spacer blanks and may reduce the likelihood of pieces coming from the edge being mistaken as spacer blanks.

Figure 6:
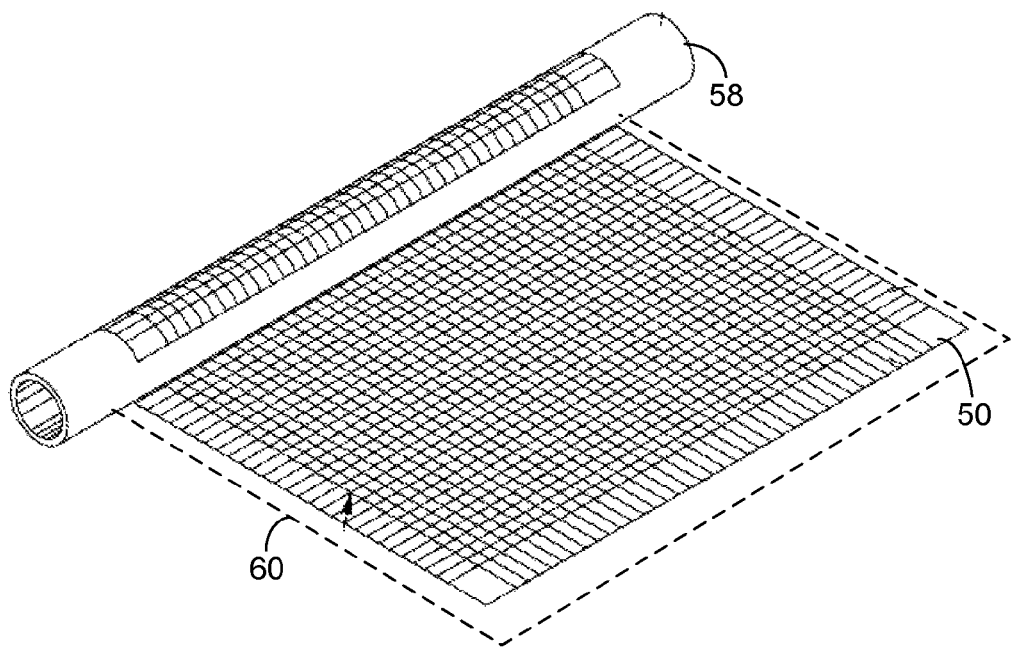
FIG. 6 diagrammatically depicts a roller used to break the scribed glass sheet of FIG. 5.

After being scribed, the glass sheet 50 may be broken along the plurality of scribe lines. According to one embodiment, breaking the glass sheet 50 may include supporting the glass sheet 50 on a relatively soft elastomeric sheet (e.g., a rubber sheet, silicone sheet, etc.) with the scribed side facing the elastomeric sheet and rolling a roller across the glass sheet in a direction perpendicular to the plurality of scribe lines to be broken. Referring also to FIG. 6, a roller 58 may be rolled across the glass sheet 50 in a direction generally perpendicular to the scribe lines 54 (e.g., the roller 58 may be oriented generally parallel to the scribe lines 54 and rolled across the glass sheet 50 in a direction generally perpendicular to the scribe lines 54) to break the glass sheet along the scribe lines 54. The roller 58 may also be rolled across the glass sheet 50 in a direction generally perpendicular to the scribe lines 52 to break the glass sheet along the scribe lines 52, thereby forming the spacer blanks having a generally rectilinear periphery consistent with the illustrative example. The elastomeric sheet (e.g., elastomeric sheet 60, shown in broken line) may generally support the glass sheet 50, while allowing sufficient compliance to break the glass sheet 50 along the scribe lines 52, 54. Supporting the glass sheet with the elastomeric sheet may include placing the glass sheet on one surface of the elastomeric sheet such that the side of the glass sheet including the plurality of scribe lines is against the surface of the elastomeric sheet. Further in an embodiment, the roller may be rolled across the opposite surface of the glass sheet and/or rolling the glass sheet and elastomeric sheet about the roller. The roller 58 may, for example, have a diameter that may be on the order of ten times a maximum dimension of each spacer blank. However, the diameter of the roller may vary depending upon process requirements, and user preference.

It will be appreciated that for other polygonal peripheries, such as triangular, additional sets of scribe lines may be created (e.g., three total sets of scribe lines in the case of spacer blanks having a generally triangular profile). Accordingly, the number of passes of the roller may generally correspond to the number of sets of scribe lines. Similarly, the orientation of each pass by the roller may vary according to the orientation of each set of scribe lines.

According to an embodiment, breaking the sheet of glass may include adhering a dicing tape to a side of the glass sheet opposite the plurality of scribe lines. The dicing tape may include, for example, a tape having a pressure sensitive adhesive that may be at least partially released upon exposure to ultraviolet light. The dicing tape may be applied to the glass sheet before the glass sheet is scribed to create the plurality of scribe lines or after the glass sheet is scribed. According to one embodiment, the dicing tape may retain the spacer blanks once the glass sheet has been broken. Retaining the spacer blanks on the dicing tape may, for example, facilitate collection of the spacer blanks following breaking of the glass sheet, and may reduce damage to the spacer blanks following breaking of the glass sheet.

At least a portion of the plurality of spacer blanks may be released from the dicing tape after breaking the sheet of glass. For example, once the glass sheet has been broken to produce the plurality of spacer blanks, the spacer blanks and dicing tape may be exposed to ultraviolet light to at least partially release the spacer blanks from the dicing tape. Further, the spacer blanks may be fully released from the dicing tape, for example, using one or more solvent baths. Suitable solvents may include, but are not limited to, acetone and methanol. In some embodiments, sequential acetone and methanol baths may be utilized. Additionally, release of the spacer blanks from the dicing tape may also be facilitated, e.g., by flexing or rolling the dicing tape with the spacer blanks on the convex side of the flexed or rolled dicing tape. The full release of the spacer blanks from the dicing tape may allow the spacer blanks to be capture (e.g., in the solvent bath). The spacer blanks may be separated from any waste (e.g., pieces of the glass sheet 50 from the margin 56) using one or more appropriately sized sieves. For example, a sieve stack including 1.4 mm, 1.18 mm, and 0.5 mm sieves may be utilized to separate 1 mm×1 mm square spacer blanks from any waste. Additionally/alternatively, at least a portion of the waste such as the margin area may be removed prior to fully releasing the spacer blanks from the dicing tape.

While the spacer blanks may be suitably cut via the scribing techniques described above, various additional/alternative cutting techniques may be equally utilized. For example, cutting the plurality of spacer blanks may include cutting the plurality of spacer blanks using one or more of a saw, a laser, or a water jet. Further, consistent with the use of a saw (such as a diamond saw), a laser, or a water jet it may be possible to cut more than one glass sheet at a time. For example, several glass sheets may be stacked on top of one another. The stacked glass sheets may all be cut in a single cutting operation. Various additional/alternative cutting processes may similarly be utilized.

Polishing the spacer blanks may include tumbling the spacer blanks with a polishing compound. Polishing the spacer blanks with a polishing compound may result in rounding one or more corners to yield a spacer blank as generally described above, and shown, e.g., in FIGS. 2 through 4. Polishing the spacer blanks may include, for example polishing the spacer blanks in a tumbler in the presences of a polishing compound. The polishing compound may include an aluminum oxide, diamond, or cerium based (e.g., cerium oxide) polishing compound. Of course various additional polishing compounds may be utilized. In an illustrative example, the spacer blanks may be tumbled in the presence of glass balls and one micron polishing powder. The glass balls may include, for example, 4 mm diameter glass balls. Further, the polishing compound may be provided as a slurry, e.g., through the addition of water, methanol, or other suitable fluid to the tumbler. Tumbling of the spacer blanks may proceed until the spacers have a desired degree of rounding of the corners. To this end, samples of the spacer blanks may be periodically removed from the tumbler and examined. Examination may, for example, utilize an optical flat, by which the degree of rounding may be ascertained.

In addition/as an alternative to mechanical polishing using a polishing compound, the spacer blanks may be chemically etched to achieve the desired rounding of the corners. Suitable etchants may include, but are not limited to, ammonium bifluoride (ABF) and hydrofluoric acid (HF). In one such example, the spacer blanks may be placed in a bath of etchant and may be agitated until the desired degree of rounding of the corners of the spacer blanks is achieved. During such a chemical etching process, etching may preferentially occur at the corners of the spacer blanks, thereby providing spacers having a desired rounding of the corners.

Following mechanical and/or chemical polishing, the spacers may be thermally polished at an elevated temperature. Thermally polishing the spacers may reduce or remove cracks, scratches, chips, or other irregularities or defects that may be present in the spacers. In some instances, thermally polishing the spacers may at least partially soften the spacers during the thermal polishing process and may smooth any scratches or chips resulting from, or remaining after, the mechanical polishing process and/or the scribing process. Consistent with one illustrative example, the spacers may be thermally polished at a temperature of about 630° C. for a duration of about three hours. It will be appreciated that other time and temperature parameters may be effectively utilized. Preferably, the spacers are thermally polished immediately prior to being sealed into clean packaging. This ensures most, if not all, contaminates on the surfaces are burned off in the thermal polishing process and the surfaces of the spacer are as clean as possible.

In addition to polishing the spacer blanks, the resultant spacers may be chemically strengthened. For example, the spacers may be immersed in an ion bath at an elevated temperature. The ion bath may result in an ion exchange at the surface of the glass creating a uniform surface compression layer. The surface compression layer may increase the strength of the spacers. An example of an ion bath may include a bath containing a potassium salt, such as potassium nitrate at a temperature greater than 380° C. Of course, other ion baths and temperatures parameters may be effectively utilized.

At one or more stages of production, the spacers and/or spacer blanks may be cleaned. For example, the spacer blanks may be cleaned prior to polishing, after polishing, prior to thermal polishing, after thermal polishing, prior to chemical strengthening, and/or after chemical strengthening. Various suitable cleaning processes may be utilized. For example, various solvents, such as acetone and methanol, for example, may be utilized. Further, cleaning may include multiple solvent baths utilizing different solvents, for example, acetone and methanol may be used sequentially. Further, cleaning may be carried out using an ultrasonic bath and/or at an elevated temperature (e.g., at a temperature of 40° C.). However, it will be appreciated that various solvents, temperatures, and cleaning techniques may be utilized. Similarly, various cleaning agents and detergents, such as surfactants, may also be utilized. Cleaning of the spacers and/or spacer blanks may also include the removal of organic residuals. For example, organic residuals may be burned off at an elevated temperature (e.g., a temperature of about 350° C.) and in the presences of oxygen or air.

Figure 7:
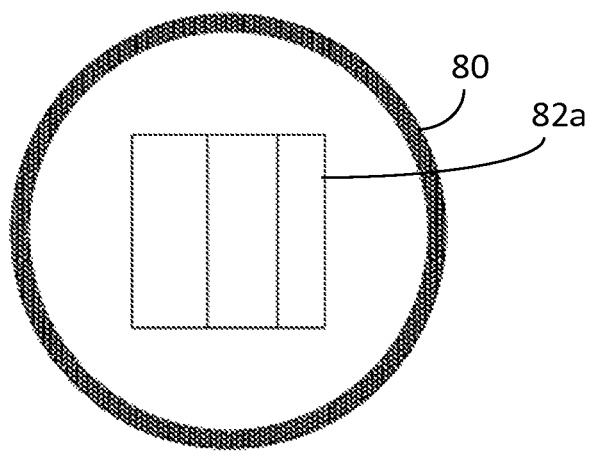
FIGS. 7 through 9 diagrammatically depict optical flat measurements of a spacer as it undergoes successive processing to establish sufficient rounding of its edges.
Figure 8:
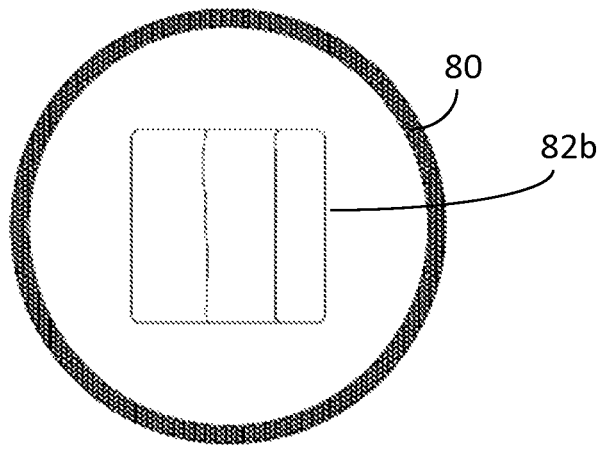
Figure 9:
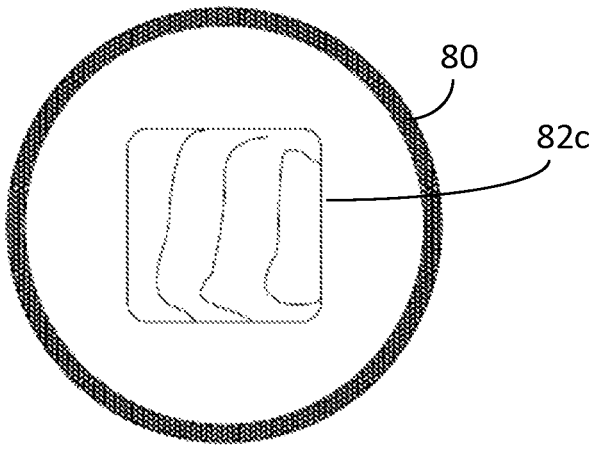

Referring also to FIGS. 7 through 9, and as briefly mentioned above, the spacers may be inspected for the desired degree of corner rounding through the use of an optical flat measuring device 80, such as one provided by Edmund Optics, part number NT43-412-000, 1/20 Lambda Zerodur Optical Flat. Measurements 82a,82b,82c may be periodically taken on samples of spacers during processing to ensure a desired amount of rounding of the spacer is achieved. For illustrative purposes, FIG. 7 shows representative flatness measurements 82a of a spacer blank before processing (i.e., before any polishing and rounding of the edges) taken via an optical flat measuring device. FIG. 8 shows representative flatness measurements 82b of a semi-finished spacer blank during processing for rounding and polishing of the edges taken via an optical flat measuring device. In FIG. 8, the optical flat measurement device shows lines that bend as the spacer face deviates from flat. A processed spacer tends to be flat on its faces with radiused breaks from the flat towards the ultimate edge. The optical flat measurement device 80 precisely indicates the point on the spacer face where the surface break begins, and the amount of surface break. In other words, the optical flat measuring device may determine the transition point where the generally flat contact footprint area ends the surface break begins. Preferably, the transition between the surface break and the contact footprint flat is very gradual to prevent concentration of stress on the glass panel from deflection inward into the separation space around the contact footprint of the spacer. FIG. 9 shows representative flatness measurements 82c of a spacer with sufficient processing.

The spacers may be processed in a batch operation, thereby allowing many spacers to be polished in a mechanical or chemical polishing system at the same rate. Periodically, a sufficient sample of spacers may be removed from the polishing and/or tumbling operation and measured on the optical flat measuring device. Once sufficient breaks are measured on the optical flat measuring device, the batch polishing operation may be completed. Thereafter, the spacers may be assembled in the VIG panel.

Having thus described the invention of the present application in detail and by reference to embodiments thereof, it will be apparent that modifications and variations are possible without departing from the scope of the invention defined in the appended claims.

What is claimed is:

1. A method comprising:
    cutting a spacer blank from a sheet of glass, the spacer blank having opposing first and second side faces and a plurality of sides defining a generally polygonal periphery for the side faces of the blank;
    polishing the spacer blank to round corners of adjoining sides around the polygonal periphery, and to round corners between the plurality of sides and the first and second faces to form the spacer with surface breaks;
    using an optical flat measuring device to measure the surface breaks of the opposed faces of the spacer during processing; and
    providing the spacer for use between first and second glass panels of a vacuum insulated glass panel when the spacer has a desired level of surface breaks as measured via the optical flat measuring device.

2. The method according to claim 1, wherein cutting the plurality of spacer blanks includes scribing the sheet of glass to create a plurality of scribe lines in the sheet of glass, and breaking the sheet of glass along the plurality of scribe lines.

3. The method according to claim 2, wherein the plurality of scribe lines define the generally polygonal periphery of the blank.

4. The method according to claim 2, wherein breaking the sheet of glass along the plurality of scribe lines includes supporting the glass sheet on an elastomeric sheet and rolling a roller across the glass sheet in a direction perpendicular to the plurality of scribe lines.

5. The method according to claim 4, wherein breaking the sheet of glass further comprises adhering a dicing tape to a side of the glass sheet opposite the plurality of scribe lines.

6. The method according to claim 5, further comprising releasing at least a portion of the plurality of spacer blanks from the dicing tape.

7. The method according to claim 1, wherein cutting the plurality of spacer blanks includes cutting the plurality of spacer blanks using one or more of a saw, a laser, and a water jet.

8. The method according to claim 1, wherein polishing the spacer blank includes tumbling the spacer blank with a polishing compound.

9. The method according to claim 1, wherein polishing the spacer blank includes chemically etching the spacer blank.

10. The method according to claim 1, further comprising thermally polishing the spacer at an elevated temperature.

11. The method according to claim 1, further comprising chemically strengthening the spacer in an ion bath.

12. The method according to claim 1, further comprising cleaning the spacer using one or more of a solvent and a surfactant.

13. The method according to claim 1, further comprising cleaning the spacer by heating the spacer to an elevated temperature.

* * * * *